United States Patent
Fischer et al.

(10) Patent No.: US 12,452,070 B2
(45) Date of Patent: Oct. 21, 2025

(54) METHOD AND SYSTEM FOR SECURE INTEROPERABILITY BETWEEN MEDICAL DEVICES

(71) Applicant: Roche Diabetes Care, Inc., Indianapolis, IN (US)

(72) Inventors: Christoph Fischer, Hambrücken (DE); Igor Gejdos, Indianapolis, IN (US); Christopher Kelsey, Fishers, IN (US)

(73) Assignee: Roche Diabetes Care, Inc., Indianapolis, IN (US)

( * ) Notice: Subject to any disclaimer, the term of this patent is extended or adjusted under 35 U.S.C. 154(b) by 336 days.

(21) Appl. No.: 18/064,536

(22) Filed: Dec. 12, 2022

(65) Prior Publication Data
US 2023/0108034 A1   Apr. 6, 2023

Related U.S. Application Data

(63) Continuation of application No. PCT/US2021/037570, filed on Jun. 16, 2021.
(Continued)

(51) Int. Cl.
*H04L 9/32* (2006.01)
*H04L 9/08* (2006.01)

(52) U.S. Cl.
CPC ............ *H04L 9/3226* (2013.01); *H04L 9/088* (2013.01); *H04L 9/3242* (2013.01)

(58) Field of Classification Search
CPC ..... H04L 9/3226; H04L 9/088; H04L 9/3242; H04L 63/0442; H04L 63/062;
(Continued)

(56) References Cited

U.S. PATENT DOCUMENTS 7,831,828 B2   11/2010   Von Arx et al.
8,190,900 B2   5/2012    Corndorf
(Continued)

FOREIGN PATENT DOCUMENTS

EP   2786288        5/2013
EP   2989574 B1     7/2018

OTHER PUBLICATIONS

International Search Report and Written Opinion; PCT/US2021/037570; Sep. 15, 2021.

*Primary Examiner* — Farid Homayounmehr
*Assistant Examiner* — Judy Bazna (57) ABSTRACT

A method for secure interoperability between an electronic device and a medical device has been developed. The method includes executing a control application configured to provide communication between the electronic device and medical device, receiving user authentication data from an authentication service, receiving a key identifier from the medical device via an untrusted connection, and transmitting a message with an identifier of the user, the user authentication data, the key identifier, an identifier of the control application, and a cryptographic signature to an authorization service. The method further includes receiving a medical device cryptographic key from the authorization service only in response to successful verification of the message to enable at least one of control communication and data communication between the control application and the medical device.

8 Claims, 5 Drawing Sheets

Related U.S. Application Data

(60) Provisional application No. 63/041,603, filed on Jun. 19, 2020.

(58) Field of Classification Search
CPC . H04L 63/0807; H04L 63/0823; H04L 63/10; H04L 9/0822; H04L 9/0838; H04L 9/3213; H04L 2209/88; G16H 20/17; G16H 40/63; G16H 40/67
See application file for complete search history.

(56) References Cited

U.S. PATENT DOCUMENTS

| | | | |
|---|---|---|---|
| 9,544,313 B2 | 1/2017 | Love et al. | |
| 9,980,140 B1* | 5/2018 | Spencer | H04W 12/02 |
| 11,722,312 B2* | 8/2023 | Diehl | H04L 9/3247 |
| 2005/0204134 A1 | 9/2005 | Von Arx et al. | |
| 2011/0145588 A1 | 6/2011 | Stubbs et al. | |
| 2014/0267770 A1 | 9/2014 | Gervautz | |
| 2018/0054435 A1* | 2/2018 | Sakamoto | H04L 9/3263 |
| 2018/0307867 A1* | 10/2018 | Dover | H04L 9/3242 |
| 2020/0094062 A1 | 3/2020 | Yoder | |
| 2020/0177628 A1 | 6/2020 | Schetina | |
| 2022/0239636 A1 | 7/2022 | Kreuzer | |

* cited by examiner

METHOD AND SYSTEM FOR SECURE INTEROPERABILITY BETWEEN MEDICAL DEVICES

CLAIM OF PRIORITY

This application claims the benefit of Patent Cooperation Treaty (PCT) application Number PCT/US2021/037570, which is entitled "Method and System for Secure Interoperability between Medical Devices," and was filed on 16 Jun. 2021, the entire contents of which are hereby incorporated herein by reference. This application claims the further benefit of U.S. Provisional Application No. 63/041,603, which is entitled "Method and System for Secure Interoperability between Medical Devices," and was filed on 19 Jun. 2020, the entire contents of which are hereby incorporated herein by reference.

TECHNICAL FIELD

The disclosure relates generally to the field of secure communication for interoperability between electronic medical devices and, more specifically, to secure communication for interoperability between medical devices used in artificial insulin delivery systems.

BACKGROUND

The field of healthcare has seen a rapid increase in the use of portable medical devices that deliver personalized healthcare to users in home, work, and other environments outside of a traditional hospital or doctor's office. Examples of these devices include, but are not limited to, continuous and spot blood glucose monitors, electronic medication delivery devices including insulin pumps and insulin smart pens, health and fitness trackers, and the like. In many instances, a medical device is used in a "standalone" configuration in which a user operates a medical device individually without any substantial communication between the medical device and other electronic devices. For example, some blood glucose monitors provide measurements of blood glucose levels to enable a person with diabetes (PwD) or caregiver to monitor his or her blood glucose levels manually, but the blood glucose monitor does not interact with other electronic devices to measure and provide the blood glucose measurements to the PwD. More recently, some medical devices have incorporated wired and wireless data connectivity that enables a medical device to transmit data, such as blood glucose measurements, to other computing and electronic devices. Furthermore, medication delivery devices such as insulin pumps or smart pens can receive commands to control the delivery of insulin or other medications from a remote control device.

The advent of medical devices that include data connectivity has led to further development of automated insulin delivery ("AID") systems. While a detailed description of every aspect of an AID is beyond the scope of this document, in general an AID system uses data collected from one or more continuous glucose monitor (CGM) as an input to a control system that controls the delivery of insulin to a PwD via an insulin pump. The AID system adjusts the level of insulin delivery to enable the PwD to maximize the amount of time spent "in range", which refers to an optimal range of blood glucose levels that promote the health of the PwD by minimizing the occurrences of both hyperglycemic and hypoglycemic conditions.

While the precise configuration of AID systems may vary, one common configuration includes a CGM, an insulin pump, and a control device. The control device receives blood glucose measurement data from the CGM and implements one or more algorithms that control the delivery of insulin from the pump to control the blood glucose level of the PwD over time. Of course, the CGM, insulin pump, and control device require interoperability to deliver effective blood sugar levels to the PwD. As used herein, "interoperability" refers to AID system components that are configured to process data and command messages from at least one other device in the system, such as the control device being configured to interpret glucose data and alarm messages from the CGM and to generate command messages in a format that is compatible for operation of the insulin pump. While some AID systems include a CGM, insulin pump, and control device that are all manufactured by a single entity to ensure interoperability, other systems provide interoperability between components from different manufacturers.

While interoperability between components of an AID system is generally within the capability of the art, there are continuing challenges regarding the security of information and operation of the AID system. Two non-limiting examples of potential security issues include the unauthorized disclosure of data pertaining to the PwD's glucose levels and insulin therapy dosage, and the potential for an unsecured AID system to deliver incorrect insulin dosages to the PwD via malicious control of the insulin pump. The state of the art generally attempts to avoid these issues by strict limits in the types of devices that can operate within an AID system. This leaves the PwD with extremely limited options for choosing an AID system or, alternatively, leaves open the possibility of security breaches in AID implementations that do not enforce these limitations. Consequently, improvements AID systems that enable interoperability with improved security between medical devices would be beneficial.

SUMMARY

In one embodiment, a method for secure medical device interoperability includes executing, with a processor in an electronic device controlled by a user, a control application configured to communicate with a medical device operated by the user, receiving, with the electronic device, user authentication data generated in response to a user authentication process, establishing an untrusted connection between the electronic device and the medical device, receiving, with the electronic device, a key identifier from the medical device through the untrusted connection, transmitting, with the electronic device, a message containing data corresponding to an identifier of the user, the user authentication data, the key identifier, an identifier of the control application, and a cryptographic signature of the message to an authorization service, the cryptographic signature being generated using a secret key stored in a memory of the electronic device, receiving, with the electronic device, a medical device cryptographic key from the authorization service only in response to successful verification of the message that authorizes the user and the control application, and establishing a trusted connection between the electronic device and the medical device using the medical cryptographic key to enable at least one of control communication and data communication between the control application and the medical device.

In another embodiment, a method for secure medical device interoperability includes receiving, with an authorization service, a message from an electronic device that seeks authorization to control a medical device, the message containing data corresponding to an identifier of a user, user authentication data, a key identifier corresponding to a medical device cryptographic key stored in a memory of a medical device, an identifier of a control application executed by the electronic device, and a cryptographic signature of the message, verifying, with the authorization service, authorization of the control application based on the identifier of the control application and verification of the cryptographic signature for the message using a first cryptographic key stored in the memory of the authorization service, the first cryptographic key being associated with the identifier of the control application, verifying, with the authorization service, authorization of the user based on the data corresponding to the identifier of the user and the user authentication data using a second cryptographic key stored in a memory of the authorization service, the second cryptographic key being associated with an authentication service, and transmitting, with the authorization service, a device cryptographic key that corresponds to the key identifier to the electronic device to enable the electronic device to establish a trusted connection with the medical device only in response to a successful verification of authorization for the control application and a successful verification of authorization for the user.

In another embodiment, a method for secure medical device interoperability includes establishing, with a medical device, an untrusted connection with an electronic device, transmitting, with the medical device, a key identifier corresponding to a public key and private key associated with the medical device to the electronic device, the key identifier and the private key being stored in a memory of the medical device, establishing, with the medical device, a trusted connection with the electronic device using the private key held in a memory of the medical device only in response to a control application that is executed by the electronic device receiving the public key based on the key identifier, and performing an operation based on a command received from the control application in the electronic device only in response to the command being received via the trusted connection.

BRIEF DESCRIPTION OF THE DRAWINGS

The advantages, effects, features and objects other than those set forth above will become more readily apparent when consideration is given to the detailed description below. Such detailed description makes reference to the following drawings, wherein.

DETAILED DESCRIPTION

These and other advantages, effects, features and objects are better understood from the following description. In the description, reference is made to the accompanying drawings, which form a part hereof and in which there is shown by way of illustration, not limitation, embodiments of the inventive concept. Corresponding reference numbers indicate corresponding parts throughout the several views of the drawings.

While the inventive concept is susceptible to various modifications and alternative forms, exemplary embodiments thereof are shown by way of example in the drawings and are herein described in detail. It should be understood, however, that the description of exemplary embodiments that follows is not intended to limit the inventive concept to the particular forms disclosed, but on the contrary, the intention is to cover all advantages, effects, and features falling within the spirit and scope thereof as defined by the embodiments described herein and the claims below. Reference should therefore be made to the embodiments described herein and claims below for interpreting the scope of the inventive concept. As such, it should be noted that the embodiments described herein may have advantages, effects, and features useful in solving other problems.

The devices, systems and methods now will be described more fully hereinafter with reference to the accompanying drawings, in which some, but not all embodiments of the inventive concept are shown. Indeed, the devices, systems and methods may be embodied in many different forms and should not be construed as limited to the embodiments set forth herein; rather, these embodiments are provided so that this disclosure will satisfy applicable legal requirements.

Likewise, many modifications and other embodiments of the devices, systems and methods described herein will come to mind to one of skill in the art to which the disclosure pertains having the benefit of the teachings presented in the foregoing descriptions and the associated drawings. Therefore, it is to be understood that the devices, systems and methods are not to be limited to the specific embodiments disclosed and that modifications and other embodiments are intended to be included within the scope of the claims. Although specific terms are employed herein, they are used in a generic and descriptive sense only and not for purposes of limitation.

Unless defined otherwise, all technical and scientific terms used herein have the same meaning as commonly understood by one of skill in the art to which the disclosure pertains. Although any methods and materials similar to or equivalent to those described herein can be used in the practice or testing of the methods, the preferred methods and materials are described herein.

Moreover, reference to an element by the indefinite article "a" or "an" does not exclude the possibility that more than one element is present, unless the context clearly requires that there be one and only one element. The indefinite article "a" or "an" thus usually means "at least one." Likewise, the terms "have," "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. For example, the expressions "A has B," "A comprises B" and "A includes B" may refer both to a situation in which, besides B, no other element is present in A (i.e., a situation in which A solely and exclusively consists of B) or to a situation in which, besides B, one or more further elements are present in A, such as element C, elements C and D, or even further elements.

Figure 1:
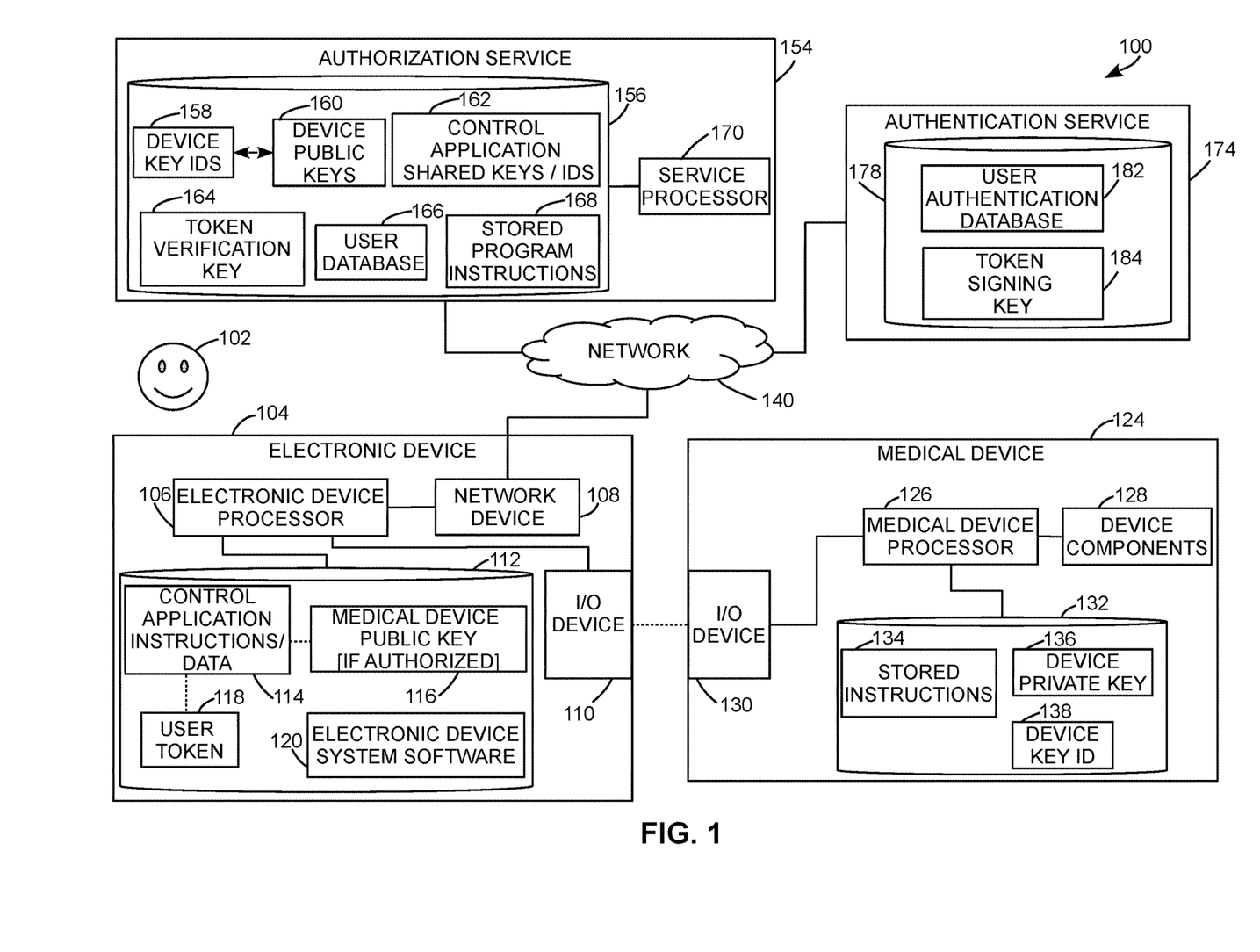
FIG. 1 is a schematic diagram of a system that enables secure interoperability between an electronic device controlled by a user and a medical device.

FIG. 1 depicts a schematic diagram of a system 100 that enables secure interoperability between a remote control application that is executed using an electronic device 104 and a medical device 124 that is placed in communication with the electronic device 104. In the illustrative embodiment of FIG. 1, the system 100 includes the electronic device 104, a medical device 124, an authorization service 154 and an authentication service 174. A data network 140 enables communication between the electronic device 104 and both of the authorization service 154 and authentication service 174. A user 102, who is a person with diabetes (PwD) or a caregiver in the example of FIG. 1, operates the electronic device 104 and the medical device 124.

In more detail, the electronic device 104 includes an electronic device processor 106 that is operatively connected to a network device 108, input/output (I/O) device 110, and a memory 112. While the specific attributes and operations of certain components in the electronic device 104 that are relevant to establishing a trusted connection with the medical device 124 for secure interoperability are described in further detail herein, in at least some embodiments the electronic device 104 is embodied as a commercially available smartphone, tablet computer, personal computer, a wearable device such as a smartwatch or fitness tracker, or another suitable electronic device that is operated by the user 102.

In the electronic device 104, the processor 106 is a digital logic device formed from one or more integrated circuits that typically includes one or more central processing unit (CPU) cores and a graphical processing unit (GPU) to execute stored program instructions that implement an operating system and application software and to provide a graphical user interface via one or more display devices, which are not illustrated expressly in FIG. 1. Amongst other software programs, a control application that is configured to send commands to and receive data from the medical device 124 is one example of a software program that the processor 106 executes during operation. The processor 106 further incorporates peripheral device and memory controllers that provide operative connections to the network interface 108, I/O device 110, and the memory 112. In at least some embodiments, the processor 106 includes a secure cryptoprocessor that handles the secure storage of cryptographic keys in memory to maintain the secrecy, isolation, and integrity of shared secret cryptographic keys, private cryptographic keys, and other non-public data. Additional elements of the processor 106 optionally include digital signal processors (DSPs), image processing units, neural network accelerators, analog-to-digital converters, digital-to-analog converters, and any other suitable digital and analog electronic components. FIG. 1 depicts the processor 106, network device 108, I/O device 110, and memory 112 as separate components for explanatory purposes, but in in some embodiments the processor 106 is implement as a System on a Chip (SoC) configuration that incorporates some or all of the components of the network device 108, I/O device 110, and the memory 112.

In the electronic device 104, the network device 108 is a wired or wireless network transceiver that enables the electronic device 104 to communicate with remote computing systems, including the authorization service 154 and the authentication service 174, via the data network 140. Examples of network devices include wired network interface devices such as Ethernet network adapters and wireless network devices including wireless local area network (WLAN) devices such as IEEE 802.11 wireless network adapters and wireless wide area network (WWAN) device such as modems for cellular or satellite networks. More generally, in the system 100 the network device 108 is a communications transceiver that enables communication via the data network 140 using Internet Protocol (IP) communications or another suitable network protocol to provide communications with the authorization service 154 and the authentication service 174.

In the electronic device 104, the I/O device 110 is, for example, a wireless or wired I/O interface that provides a direct communication channel between the electronic device 104 and an external computing device such as the medical device 124. Non-limiting examples of wireless I/O devices include a Bluetooth transceiver that implements one or more of the Bluetooth family of protocols including Bluetooth low-energy (BLE) and a near field communication (NFC) adapter. A non-limiting example of a wired I/O device includes a universal serial bus (USB) adapter. Additionally, alternative I/O device embodiments that provide a compatible communication interface between the electronic device 104 and the medical device 124 may be used as well.

In the embodiment of FIG. 1, the I/O device 110 in the electronic device 104 is configured for direct communication with a corresponding I/O device 130 in the medical device 124. This point-to-point communication channel does not require the use of a data network for communication between the electronic device 104 and the medical device 124. Of course, those of skill in the art will recognize that a medical device embodiment with a network interface could communicate with the electronic device 104 or other computing systems via a network, such as the network 140, but in the illustrative embodiment of an AID system a direct communications link using the peripheral devices 110 and 130 is often preferable since such links do not require the availability of a network, and many practical direct communication I/O interfaces require less electrical power to operate, which enhances the effective runtime of battery-powered electronic devices and medical devices.

In the electronic device 104, the memory 112 includes one or more volatile data storage devices such as random access memory (RAM) and non-volatile data storage devices such as solid state memory, magnetic, or optical media that store programmed instructions and data to control the operation of the electronic device 104. In particular, FIG. 1 depicts the memory 112 storing control application instructions and data 114 (hereinafter referred to as the "control application 114") for the control application that is configured to communicate with the medical device 124. The memory 112 also stores a cryptographic device key such as a public key 116 or a shared-secret cryptographic device key that the electronic device 104 receives from the authorization service 154 only in response to successful authentication and authorization of the control application 114 and the user 102, and a user token 118, which the electronic device 104 receives from the authentication service only in response to successful authentication of the user 102. The memory 112 further stores the electronic device system software 120, which typically include a commercially available operating system along with system libraries, services, hardware drivers, and other applications that are stored in the memory 112. In particular, in at least some embodiments the system software 120 provides an authentication application that enables the user 120 to authenticate his or her identity with the authentication service 174 without providing any private authentication data directly to the control application 114.

Figure 2:
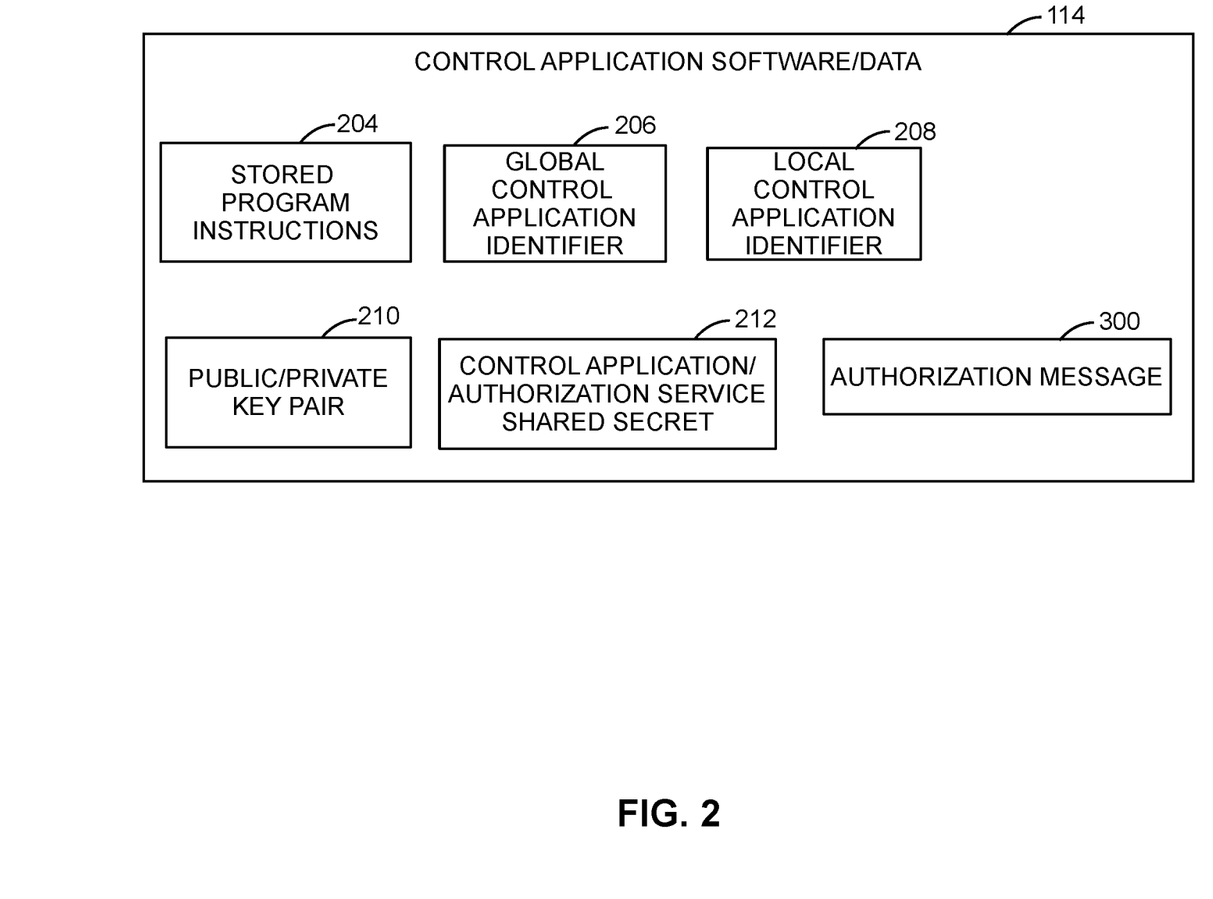
FIG. 2 is a schematic diagram depicting stored program instructions and other data used and generated by a control application in the electronic device of FIG. 1.

FIG. 2 depicts program instructions and data that are either included in the control application 114 at the time of software packaging or that the control application 114 generates during execution in greater detail. The control application 114 includes stored program instructions 204 that the electronic device processor 106 executes to implement the operations of the control application 114 in conjunction with components of the electronic device 104 and other elements of the system 100. The global control application identifier 206 is an identifier, such as a numeric, string, or other data identifier that corresponds to a publicly available identifier for the application software that is common to multiple installations of the control application, such as all instances of a particular application or all instances of a particular version of the application software. The local control application identifier 208 is another identifier, such as a numeric, string, or other data identifier, that the control application 114 generates during operation as a unique identifier for a particular installation of the control application 114. The public/private key pair 210 includes a public key and a private key that the processor 106 generates using a predetermined key generation protocol to enable the control application 114 to perform a key exchange protocol with the medical device 124 if the system 100 successfully completes the authentication and authorization processes described herein. The authorization message 300 includes data corresponding to an identifier of the user, the user authentication data, the key identifier, an identifier of the control application, and a cryptographic signature that the electronic device 104 transmits to the authorization service 154 as described in more detail below.

Referring again to FIG. 1, the medical device 124 includes a medical device processor 126 that is operatively connected to one or more device components 128, an I/O device 130, and a memory 132. In the medical device 124, the processor 126 is a digital logic device formed from one or more integrated circuits that typically includes one or more CPU cores and optionally includes other digital and analog processing components formed in an application specific integrated circuit (ASIC) configuration. While those of skill in the art will recognize that the medical device processor 126 can be implemented using the same or similar components as the electronic device processor 106, in many practical embodiments the medical device processor 126 is implemented with a more narrowly focused design to ensure reliable operation of the medical device 124 and to reduce implementation cost and electrical power consumption requirements. In at least some embodiments, the processor 126 includes a secure cryptoprocessor that handles the secure storage of cryptographic keys in memory to maintain the secrecy, isolation, and integrity of shared secret cryptographic keys, private cryptographic keys, and other non-public data. In the medical device 124, the device components 128 refer to additional components in the medical device that are operated by the processor 126, such at pump motors and fluid sensors in an insulin pump or blood glucose sensing devices in a CGM. The I/O device 130 is another instance of a peripheral device that is compatible with the I/O device 110 to enable communication between the medical device 124 and the electronic device 104.

In the medical device 124, the memory 132 includes volatile and non-volatile data storage devices. The memory device 124 is optionally implemented using Universal integrated circuit cards (UICCs), microSD cards, embedded SEs (eSEs), or embedded UICCs (eUICCS). The memory 132 stores program instructions 134, one or more device cryptographic keys including private keys 136 or shared-secret cryptographic keys that are unique to each instance of the medical device 124 and are stored in the memory 132 at time of manufacture or generated via a key derivation function during operation, and one or more corresponding key identifiers 138 that correspond to the one or more device cryptographic keys without revealing the contents of the device cryptographic keys. In the illustrative embodiment of FIG. 1, the device cryptographic keys 136 include one or more private keys 136 that each correspond to a public key 160 stored in the memory 156 of the authorization service 154. In one embodiment, the key identifier 138 is generated by applying a cryptographically-secure hash function to the public key that corresponds to the private key 136, where the authorization service 154 stores the public key with public key data 160, and the key identifier 138 is stored both in the device memory 132 and with device key identifiers 158 in the memory of the authorization service 154. In alternative embodiments, the key identifier 138 is unique to each medical device such a universal unique identifier (UUID), a value generated by applying the cryptographically secure hash function to the medical device private key 136 instead of the public key, or another value that uniquely identifies each medical device. In many medical device embodiments, the stored instructions 134 are implemented as device firmware that controls the operation of the medical device 124 but does not provide for installing and operating general software programs in a similar manner to the electronic device 104. Once again, while those of skill in the art will recognize that a medical device may be configured with general purpose processors and software, in many practical embodiments a more restricted firmware implementation improves the operational reliability of the medical device 124 and reduces the hardware and electrical power consumption requirements for the operation of the medical device 124.

As described above, the authorization service 154 stores public keys 160, where each public key corresponds to a corresponding private key 136 in the medical device 124. As used herein, the term "public key" in the context of the public/private key pair used by each medical device 124 has a somewhat different connotation than the general meaning used in the art. In the context of the system 100, the public keys 160 are originally known only the authorization service 154 and are provided to individual electronic devices, such as the electronic device 104, only in response to successfully completion of the authentication and authorization processes described herein. This differs from the general meaning of a "public key" in which the public key is freely available to the entire world ("public") and there are no restrictions on access to the public key. Functionally however, the public key and private key pair for each medical device 124 operate in the expected manner for public/private key pairs for the purposes of performing data encryption/decryption, digital signature generation/verification, and in performing key exchange protocols including, but not limited to, the elliptic curve Diffie-Hellman key exchange protocol in at least some embodiments. In an alternative configuration, the device public keys 160 and the device private keys 136 may be replaced by a single shared-secret key that is used in a symmetric cryptographic system. As such, any references to the device public keys 160 and device private keys 136 used in asymmetric cryptographic schemes herein should also be understood to be applicable to shared-secret cryptographic keys used in symmetric cryptographic schemes.

In the electronic device 104 and the medical device 124, the I/O interfaces 110 and 130 provide for the establishment of both an untrusted connection and trusted connection using the communication channel provide by these I/O interfaces. An untrusted connection enables communication between the control application of the electronic device 104 and the medical device 124, but the medical device 124 does not accept operational command messages from the control application 114 and only provides access to publicly available data, such as the device key identifier 138, to the electronic device 104. If the control application 114 and the user 102 perform successful authentication and authorization in the system 100 using the processes described herein, then the control application 114 in the electronic device 104 establishes a trusted connection via the use of the device public key 116 that the authorization service 154 transmits to the electronic device 104 in response to successful authorization in conjunction with the control application public/private key pair 210 using, for example, an elliptic curve Diffie-Hellman (ECDH) key exchange protocol. The trusted connection enable cryptographic signatures and encryption for data transmitted and received with the I/O devices 110 and 130 to enable the medical device processor 126 to ensure that commands and other data received from the control application 114 can be trusted. After the electronic device 104 and the medical device 124 establish the trusted connection, the medical device processor 126 can accept commands that that the control application 114 transmits to the medical device 124 via the trusted connection, and the medical device 124 can transmit data such as operational state information pertaining to an insulin pump or glucose data generated by a CGM to the control application 114 via the trusted connection.

In the system 100, the authorization service 154 is a network-connected computing system that is implemented using one or more server computing devices implemented using commercially available hardware including one or more service processors 170 and a memory 156 that includes both volatile RAM memory and non-volatile storage including various combinations of solid state and/or magnetic disks. The authorization service 154 is further connected to the network 140 using, for example, Ethernet or other networking adapters to enable communication with remote computing devices including the electronic device 104. The authorization service 154 is implemented using dedicated hardware, virtualized servers, containerized servers, or any other suitable hardware configuration as is generally known to the art. In the authorization service 154, the memory 156 stores program instructions 168 including, for example, and operating system and server software that the service processors 170 execute to implement the functions of the authorization service 154.

In the authorization service 154, the memory 156 also stores device key identifiers 158 in association with the corresponding public keys 160 of multiple medical devices using a database or other suitable lookup structure. As is known the art, each public key 160 stored in the memory 156 corresponds to the private key 136 stored in the memory 132 of one medical device 124. The device key identifiers 138/158 each correspond to one public/private key pair. In the illustrative embodiment of FIG. 1, the public/private key pairs are cryptographic keys used with an elliptic curve cryptographic scheme including, for example, 224 bit, 256 bit, 384 bit, 512 bit, or any other suitable key sizes. However, alternative embodiments can employ keys used with other forms of public key cryptography including, but not limited to, RSA, ElGamal, post-quantum asymmetric cryptographic schemes, and the like. While each medical device 124 stores an individual private key 136 and key identifier 138 that is unique to that particular medical device, the authorization service 154 stores a copy of the key identifier 138 with the key identifier data 158 in association with the unique public key 160 that corresponds to the private key 136 in the medical device 124. Of course, since there are typically a large number of medical devices, the memory 156 generally stores multiple device key identifiers 158 and device public keys 160 that correspond to unique private keys for the multiple medical devices.

In the authorization service 154, the memory 156 also stores control application shared key and identifier data 162. The shared key and identifier data 162 is, for example, a database or suitable lookup structure that stores shared cryptographic keys and identifiers of different approved control applications that are authorized to operate with the medical device 124. The manufacturer of the medical device 124 approves one or more control applications from third party developers after successful completion of a testing and validation process to ensure that the control application can operate the medical device 124 in an approved manner. The medical device manufacturer generates and provides a shared secret key and a global control application identifier to the control application. The control application developer then incorporates the shared secret key and the global control application identifier into the control application 114 to enable the control application 114 to sign an authorization message as is described in further detail below. The authorization service 154 uses the appropriate shared secret key 162 to verify the authenticity of the signature from the control application 114. In some embodiments, the developer obtains a different secret key and global application identifier for each new version of the control application 114, and the authorization service 154 deletes the shared keys and global identifiers of older control application versions to prevent the authorization of older versions of the control application 114.

In the authorization service 154, the memory 156 also stores a token verification key 164 and a user database 166. The token verification key 164 is a cryptographic key that enables the authorization service 154 to verify the authenticity of a user token. The user token is a data message that is generated by the authentication service 174 if the user 102 successfully completes an authentication process to validate his or her identity. While the precise structure of the user token may vary with different implementations, in general each token includes at least one piece of information that identifies the user 102, such as a unique username, user number, or email address, along with a timestamp and a cryptographic signature of all the information included in the token. As described in further detail below, the authorization service 154 receives the user token as part of an authorization message from the electronic device 104 after the authentication service 174 transmits the user token to the electronic device 104. During operation, the authorization service 154 verifies that the user token is authentic using the token verification key 164 to verify authenticity of the cryptographic signature. The authorization service 154 also ensures that the timestamp data in the user token are sufficiently recent (e.g. less than 60 seconds old in one configuration) to ensure that the user token has been recently issued to avoid replay attacks that attempt to reuse old tokens to provide false user authentication data. Additionally, the authorization service 154 verifies that the identity of the user in the user token corresponds to a previously registered user in the user database 166, since in some configurations the authentication service 174 may authenticate users that are not registered with the authorization service 154. During a prior registration process, the user 102 provides necessary information to the manufacturer to enable the manufacturer to contact the user 102 with pertinent information relating to the medical device 124 to ensure user safety, and the user database 166 stores the user identifier and registration information.

In the system 100, the authentication service 174 is another network-connected computing system that is implemented using one or more server computing devices implemented using commercially available hardware including one or more service processors (not illustrated) and a memory 178 that includes both volatile RAM memory and non-volatile storage including various combinations of solid state and/or magnetic disks. The authentication service 174 may be implemented using dedicated hardware, virtualized servers, or containerized servers as is generally known to the art.

In the authentication service 174, the memory 178 stores a user authentication database 182 that includes identification data for users including the user 102 and data necessary for verifying the identity of the users during an authentication process. The authentication service 174 enables the user 102 to perform an authorization process based on the user identifier combined with, for example, a password, a cryptographic signature generated by the user 102 and a predetermined private key, a code generator, two-factor authentication, or any other suitable authentication process. In some configurations, the authentication process for the user 102 may be automated using account credential data that are already stored in the electronic device memory 112. For example, some smartphone devices provide user account data corresponding to the user 102, and the electronic device 104 may provide this account data to the authentication service 174 to automate the user authentication process without requiring additional manual input from the user 102. The authentication service 174 uses the token signing key 184 to generate the cryptographic signature for the generated token in response to a successful authentication, and the authorization service 154 subsequently verifies the cryptographic signature using the token verification key 164. In the embodiment of FIG. 1, the token signing key 184 and the token verification key 164 are both a single shared secret key that is shared between the authentication service 174 and the authorization service 154. In another embodiment, the token signing key 184 is a private key and the token verification key 164 is a corresponding public key in a public/private key pair. In the embodiment of FIG. 1, the token signing key 184 and the token verification key 164 are used to form a specific trust relationship between the authorization service 154 and the authentication service 174, and the authentication service 174 optionally stores additional token signing keys that form trust relationships with other services. As such, in the system 100 each signed user token from the authentication service 174 indicates that the user 102 has successfully completed authentication with the authentication service 174 for specific use by the authorization service 154.

FIG. 1 depicts the authentication service 174 as a separate service from the authorization service 154, where the authorization service 154 is under the control of the manufacturer of the medical device 124 and the authentication service 174 is a third-party service that has a trust relationship with the authorization service 154. In another configuration, the authentication service 174 is also controlled by the manufacturer of the medical device 124, although the operation of both embodiments is substantially the same.

While FIG. 1 depicts a single medical device 124 for illustrative purposes, in some configurations the control application 114 in the electronic device 104 establishes trusted connections with two or more medical devices 124 using the processes described herein. In a non-limiting example of an AID system, a first medical device is an electronic medication delivery device such as a medication pump that delivers insulin, glucagon, both insulin and glucagon, or other medications to the user 102 while a second medical device is a continuous glucose monitor (CGM) that provides measurement data corresponding to a blood glucose level of the user. In this example, the control application establishes separate trusted connections with both the medication pump and the CGM. The medication pump and the CGM may be produced by a single manufacturer or by different manufactures. In particular, in one configuration the control application 114 receives authorization from two different instances of the authorization service 154 that enables a single control application 114 to interoperate with medical devices from multiple manufacturers. For simplicity of operation, the user 102 is only required to authenticate himself or herself with a single authentication service 174 in systems in which multiple device manufacturers utilize compatible user authentication services, which simplifies operation of an AID system for the user 102. In the context of a PwD, another electronic medication delivery device could be an insulin or glucagon injector that receives a dosage instruction from the control application, which may be referred to as a "smart pen". The control software transmits a command to the smart pen to set a dose of medication that is injected into the PwD to control blood glucose. Still other medical devices include a spot blood glucose meter that produces a single blood glucose measurement during each use, or a fitness tracker that measures various vital signs of the user 102 other than blood glucose measurements, and the control application 114 establishes a trusted connection with the fitness tracker to receive sensor data corresponding the vital signs of the user 102.

Figure 4:
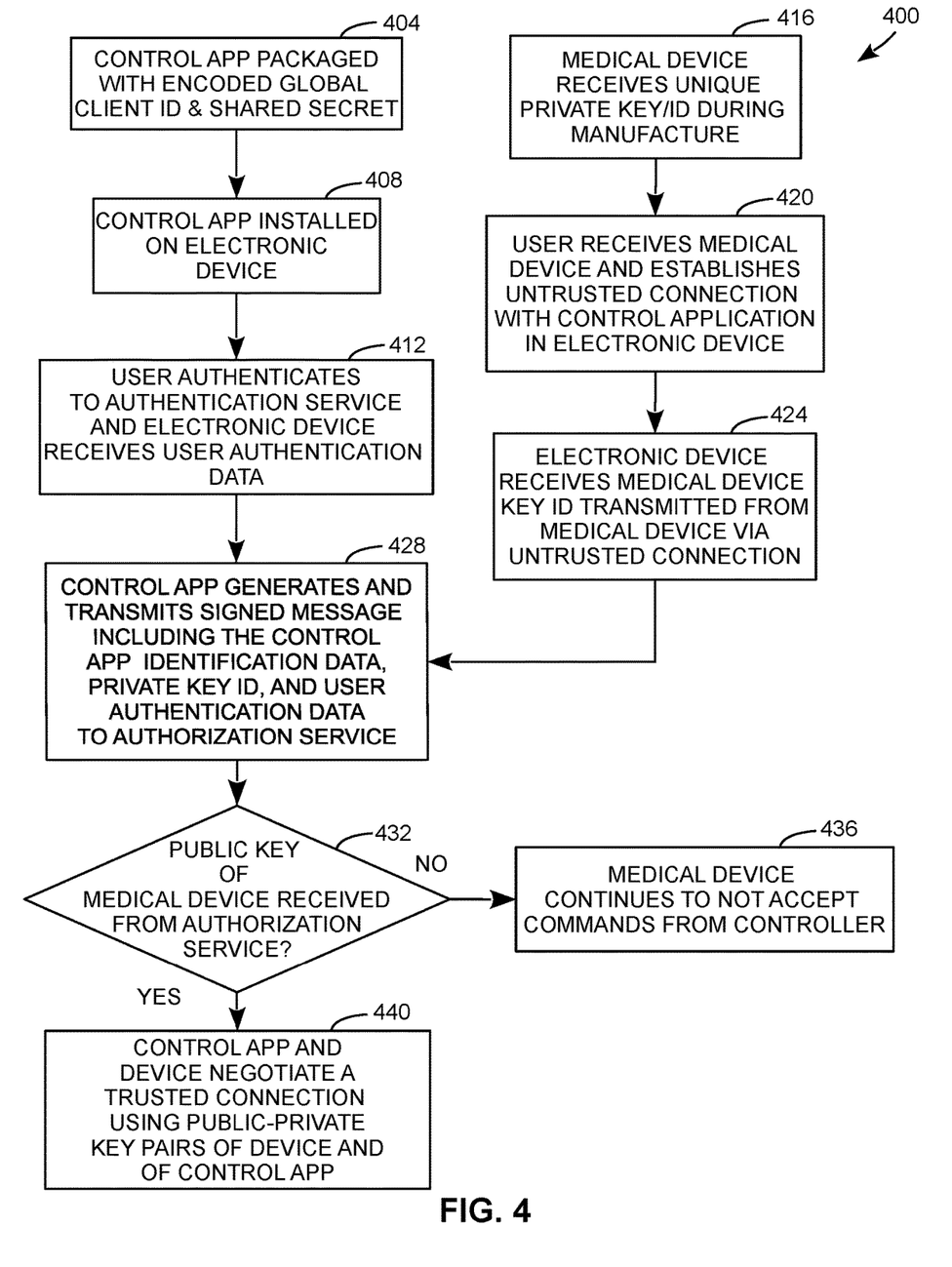
FIG. 4 is a block diagram of a process for user and control application authentication and authorization to establish a trusted connection between the electronic device and the medical device in the system of FIG. 1.

FIG. 4 depicts a process 400 for user and control application authentication and authorization to establish a trusted connection between the electronic device and the medical device in the system 100. In the description below, references to the operation of the process 400 and the control application 114 refer to the operations of one or more of the processors 106 and 126 in conjunction with other components in the electronic device 104 and the medical device 124, respectively, to implement the described operations.

During process 400, the developer of the control application 114 packages the software and data in the control application for distribution including the stored program instructions 204 and other general program data along with both the global control application identifier 206 and the shared secret key 212 that enables the control application 114 to generate cryptographic signatures for verification by the authorization service 154 (block 404). The process 400 continues with installation of the control application 114 in the memory 112 of the electronic device 104 (block 408). To improve secrecy of the shared secret key 212, the installation process optionally stores the shared secret key 212 in a secure portion of the electronic device memory 112 in embodiments of the electronic device 104 that include a cryptoprocessor to support secure cryptographic key data storage. In one embodiment, the control application 114 generates the local control application identifier 208 and the public/private key pair 210 as part of the installation process, although in other configurations the control application 114 generates these elements at a later time prior to use during execution of the control application 114. While not expressly depicted herein, in at least one embodiment the developer places the packaged control application 114 in an online application store that the user 102 and electronic device 104 access via the data network 140 for retrieval and installation of the control application 114. In other embodiments, the user 102, a healthcare provider, or other entity receives the application package and installs the application in the electronic device 104.

During the process 400, the user 102 performs an authentication operation using the electronic device 104 to receive user authentication data from the authentication service 174 (block 412). As described above, the electronic device 104 provides a service, such as a web browser or other dedicated authentication software application, which enables the user 102 to provide a username and password or any other data required for an authentication process without providing sensitive data to the as-yet unauthorized control application 114. Communications between the electronic device 104 and the authentication service 174 via the network 140 are encrypted and authenticated using, for example, transport layer security (TLS) or another suitable protocol to prevent third parties from receiving private information that the user 102 provides to the authentication service 174 for the purposes of authentication. In response to a successful authentication, the electronic device 104 receives the authentication data from the authentication service 174 and provides the authentication data to the control application 114 since the authorization data does not include plaintext secret data related to the user 102. In the embodiment of FIG. 1, the user authentication data are embodied as the user token 118 stored in the electronic device memory 112. As described above, in one embodiment of the system 100 the user authentication token 118 contains the user authentication data including at least a user identifier, timestamp, and cryptographic signature of the token from the authentication service 174.

During the process 400, the medical device 124 receives one or more unique private cryptographic keys 136 and corresponding key identifiers 138 in the memory 132 during manufacture or during operation of the medical device after manufacture (block 416). In some configurations, the memory 132 stores multiple cryptographic keys 136 and corresponding key identifiers 138, which can be used to associate the medical device 124 with different third-party control applications or to enable the medical device 124 to operate in different modes in different geographic regions where different sets of control applications are approved for use. While those of skill in the art will recognize that more unique private cryptographic keys 136 can be also generated from one unique private key during operating time via a key derivation function including, for example, HMAC-SHA-224, HMAC-SHA-256, HMAC-SHA-384, HMAC-SHA-512, or any other suitable key derivation function. As described above, in one embodiment the device private key 136 is a private key used in an elliptic curve cryptographic scheme and the medical device key identifier 138 is the output of cryptographically secure hash function that is applied to the public key 160 corresponding to the medical device private key 136. Additionally, at the time of manufacture or another time prior to use of the medical device 124, the authorization service 154 receives a copy of the medical device key identifier 138 and the corresponding public key for storage with the medical device key identifier data 158 and medical device public key data 160, respectively.

The process 400 continues as the user 102 receives the medical device 124 and executes the control application 114 in the electronic device 104 in conjunction with the medical device 124 to establish an untrusted connection (block 420).

As described above, the untrusted connection enables communication between the electronic device 104 and medical device 124 via the I/O devices 110 and 130, respectively, but the medical device 124 does not accept commands from the control application 114 via the untrusted connection and only provides publicly-accessible data, such as the device key identifier 138, via the untrusted connection. Non-limiting examples of an untrusted connection include a connection formed from a Bluetooth pairing operation between the electronic device 104 and the medical device 124 in which the electronic device 104 does not have access to the medical device public key data 116 or an untrusted USB connection. After establishing the untrusted connection, the electronic device 104 receives the medical device key identifier 138 that the medical device 124 transmits via the untrusted connection (block 424). The order of operations processing depicted in FIG. 4 regarding user authentication (block 412) and receiving the medical device key identifier via the untrusted connection between the electronic device 104 the medical device 124 (blocks 420-424) is presented for illustrative purposes and these operations may occur in any order or concurrently.

Process 400 continues as the control application 114 and electronic device 104 generate and transmit a cryptographically signed authorization message to the authorization service 154 using the data network 140 (block 428). As described above, the message 300 includes data corresponding to an identifier of the user, the user authentication data received from the authentication service 174, the key identifier, an identifier of the control application, and the cryptographic signature of the message.

Figure 3:
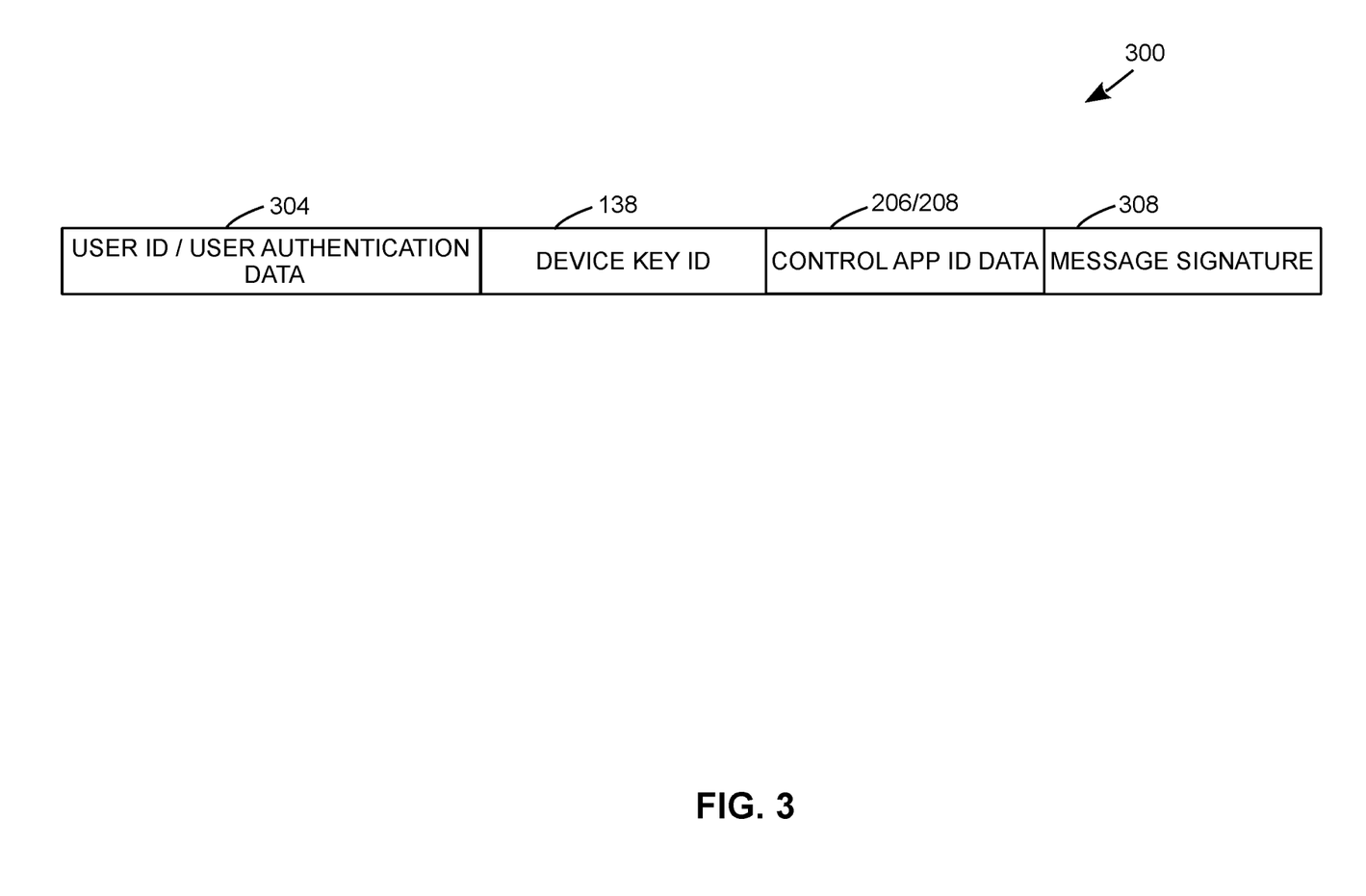
FIG. 3 is a diagram that depicts an illustrative embodiment of a message that the electronic device transmits to an authorization service in the system of FIG. 1.

FIG. 3 depicts an example of a format of the authorization message 300 in more detail. In FIG. 3, the authorization message 300 includes the user identifier and user authentication data 304, the medical device key identifier 138, control application identifier data including the global application identifier 206 and the optional local application identifier 208, and a cryptographic signature 308 corresponding to an entirety of the rest of the message 300. The user identifier and authentication data 304 include, for example, the user token 118 of FIG. 1. In some embodiments the user token 118 contains the identifier of the user 102 that is recognized in the user database 166 of the authorization service 154, while in other embodiments the user identifier is a separate piece of data that is still linked to data in the user token 118 in a manner that enables the authorization service 154 to verify the identity of the user 102.

In the embodiment of FIG. 3, the user identification and authentication data 304 also include a timestamp that identifies the time of generation for the user authentication data and, consequently, the rest of the message 300 since the cryptographic signature 308 provides a signature for the entire message 300. However, in another embodiment the message 300 includes one or more additional timestamp fields that are part of the message covered by the cryptographic signature 308 to enable the authorization service 154 to verify the age of the message 300, which reduces or eliminates "replay" attacks that attempt to provide an old but otherwise valid message to the authorization service 154.

In the message 300, the medical device key identifier 138 is the same identifier that the electronic device 104 receives from the medical device 124 via the untrusted connection. The control application identifier data fields 206/208 enable the authorization service 154 to identify the particular control application 114 type and, in some embodiments, the specific version of the control application 114. The local application identifier data 208 also enables the authorization service 154 to track specific instances of the control application 114 and to provide further security by rejecting authentication messages that include copies of already-used local application identifiers.

In one embodiment, the electronic device 104 generates the message signature 308 using a hashed message authentication code (HMAC) that corresponds to the identifier of the user and the user authentication data 304, the device key identifier 138, and the identifier of the control application 206/208, using the secret key 212 and a cryptographically secure hash function. The authorization service 154 verified the HMAC signature using a copy of the shared cryptographic key 212 that the authorization service stores in the database 162. Alternative embodiments use a different form of cryptographic signature other than an HMAC. Of course, the format of the message 300 is presented for illustrative purposes and alternative configurations use different formats and optionally contain additional information that the control application 114 signs using a cryptographic key.

Figure 5:
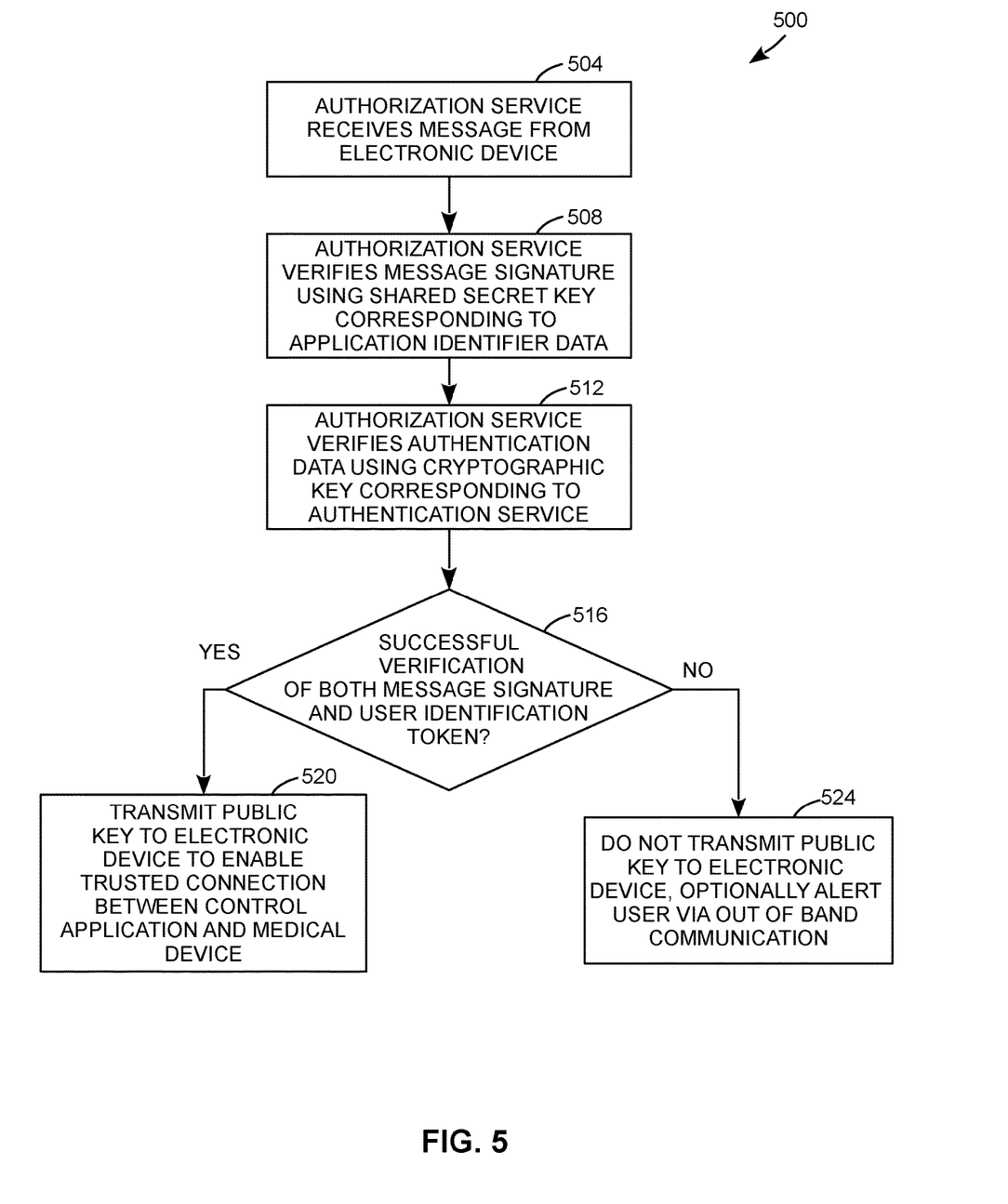
FIG. 5 is a block diagram depicting a process for operation of an authorization service during the process depicted in FIG. 4.

During the process 400, the authorization service 154 receives the message 300 transmitted from the electronic device 104 and performs a verification process for authorization of both the control application 114 and the user 102. FIG. 5 depicts the verification process 500 in further detail. In the description below, references to the operation of the process 500 and the authorization service 154 refer to the operations of the authorization service processors 170 in conjunction with other components in the authorization service 154 to implement the described operations.

During the process 500, the authorization service 154 receives the message from the electronic device 104 via the data network 140 (block 504). The authorization service 154 verifies the contents of the message using the shared secret key that corresponds to the global application identifier data contained in the message (block 508). In more detail, as described above the message 300 includes the global application identifier data 206. The authorization service 154 identifies the corresponding shared secret cryptographic key in the control application/shared key database 162 and uses the retrieved key to verify that the contents of the message correspond to the cryptographic signature that is specific to the particular control application 114 to enable successful verification of the control application 114. This prevents the control application 114 or another entity from altering to the contents of the message 300 or forging another message without access to the shared secret cryptographic key 212. Furthermore, in some embodiments the authorization service 154 invalidates older versions of the control application 114 to ensure that only up-to-date versions of the control application 114 can successfully complete the verification process. In these embodiments, the authorization service 154 stores different application identifiers and corresponding shared cryptographic keys for each version of the control application 114. The authorization service processors 170 delete or otherwise invalidate the application identifiers and cryptographic keys in the database 162 that correspond to versions of the control application 114 that are no longer valid for use with the medical device 124.

As part of verifying the contents of the message, the authorization service 154 also searches for the public key stored in the public key database 160 using the medical device key identifier 138 in the message 300 and the corresponding device key identifiers 158 to ensure that the public key corresponding to the medical device 124 is available for use. This operation is part of the message verification process to verify that the electronic device 104 received a valid medical device key identifier 138 that was included in the message 300. Additionally, in some embodiments the system 100 only enables a single control application 114 to receive the public key that corresponds to a single medical device 124 and to control operation of the medical device 124 over the lifetime of the medical device, particularly for medical devices that have relatively short operational lifespans such as a few days or weeks. In this configuration, the authorization service 154 deletes or otherwise invalidates the key identifier and public key that correspond to the medical device 124 after a single successful operation of the processes 400 and 500 to prevent the same public key from being released more than once.

During the process 500, the authorization service 154 also verifies the user identification and authentication data contained in the message, such as the user token 118 depicted in the system 100, using the cryptographic key that corresponds to the authentication service 174, such as the token verification key 164 in the system 100 (block 512). The verification of the cryptographic signature for the user token 118, which is generated by the authentication service 174 and is separate from the cryptographic signature for the entire message 300, enables the authorization service 154 to verify the identity of the user 102 and to ensure that the control application 114 or another entity has not tampered with the contents of the user token 118. Additionally, the authorization service 154 validates the contents of the user token 118 to verify that the user token 118 and any other associated user identification data properly identifies a user who is registered in the user database 166 and that the timestamp contained in the user token 118 is recent enough to enable successful verification for the identity of the user 102.

During the process 500, if the authorization service 154 completes a successful verification of both the message signature and contents to verify the control application and the verification of the user identify based on the user authentication data (block 516), then the authorization service 154 transmits the public key stored in the public key database 160 for the provided key identifier to the electronic device 104 using the data network 140 (block 520). In the system 100, a TLS or other encrypted and authenticated network connection between the electronic device 104 and the authorization service 154 prevents disclosure of the public key to third parties. As described in more detail below, if the electronic device 104 receives the medical device public key 116, then the electronic device 104 and medical device 124 can generate a trusted connection that enables the control application 114 to perform command and data retrieval communications with the medical device 124. If, however, the authorization process fails for any reason related to unsuccessful control application authorization, user authorization, or any problems with the validity of the message content, then the authorization service 154 does not transmit a public key to the electronic device 104 and the control application 114 is unable to continue with the process 400 described below (block 524). While not described in greater detail herein, in some embodiments the authorization service 154 stores a log of any invalid authorization request and optionally generates an email or other communication alert for the user 102 if the invalid request likely represents an attempt by an authorized party to operate the medical device 124 without proper authorization.

As described above, the authorization service 154 stores the necessary user database data 166 and control application shared keys and key identifiers 162 to perform authorization of both the user 102 and the control application 114. As such, the medical device 124 does not need to be pre-programmed with control-application specific or user-specific authorization data at the time of manufacture beyond receiving the medical device private key 136 and the medical device key identifier 138. This enables the authorization service 154 to, for example, provide authorization to a new control application that is produced after the manufacture of the medical device 124 or to revoke access to a previously-authorized control application prior to executing the process 500 without requiring any modification or reconfiguration of the medical device 124.

Referring again to FIG. 4, the process 400 continues as the electronic device 104 either receives the public key 116 transmitted from the authorization service 154 in response to successful authorization or does not receive the public key in response to an unsuccessful authorization (block 432). If the electronic device 104 does not receive the public key 116, then the medical device 124 continues to reject control requests from the control application 114 and the electronic device 104 (block 436). If the medical device receives the public key 116, then the control application 114 uses the public key 116 stored in the memory 112 in conjunction with the control application public/private key pair 210 to establish a trusted connection with the medical device 124 using the I/O devices 110/130 (block 440). In the illustrative embodiment of FIG. 1, the electronic device 104 transmits the control application public key in the public/private key pair 210 to the medical device 124 to ensure that the medical device 124 has access to the public key of the control application 114. Once both public keys are shared, the electronic device 104 and the medical device 124 generate the trusted connection using, for example, an elliptic curve Diffie-Hellman key exchange protocol or other suitable key generation protocol that produces a shared secret key that is shared between only the electronic device 104 and the medical device 124. This shared secret key enables both the control application 114 to cryptographically sign and encrypt command messages using the processor 106 and for the medical device processor 126 to cryptographically sign and encrypt data that are transmitted to the electronic device 104. Additionally, the medical device processor 126 uses the shared secret key to verify the authenticity of command messages and the medical device 124 can continue operation to perform commands received from the control application 114 for control communication and to provide measurement data to the control application 114 for data communication via the trusted connection.

While the process 400 described above includes an authorization process that provides authorization for the combination of the user 102 and the control application 114 of the electronic device 104, those of skill in the art will recognize that different simplified variants of this process are also disclosed in the process 400. For example, one configuration of the process 400 omits the authentication of the user 102 as described with reference to block 412. In this embodiment, the control application 114 generates and transmits a signed authorization message 300 that omits the user authentication data 304 and the authorization service 154 similarly performs the authorization of the control application 114 in the process 500, but does not attempt to authorize the user 102. This simplified embodiment reduces the requirements for the user 102 to provide information to the authentication service 174 and authorization service 154, and further supports automation of execution in the processes 400 and 500. Furthermore, in this simplified embodiment the system 100 may omit the authentication service 174 and data structures that are required for user authentication in the electronic device 104 and the authorization service 154 including, for example, the user token 118, token verification key 164, and user database 166.

As described above, the embodiments described herein provide improvements to secure interoperability between control applications and medical devices. In particular, the embodiments described herein enable third-party control applications that are not authored by a medical device manufacturer to gain access to medical devices while still maintaining security to prevent unauthorized control of a medical device. In at least some configurations, the medical device manufacturer can authorize control applications or revoke access to control applications using the authorization service 154 without requiring any update to the medical device 124. Furthermore, the embodiments described herein provide for authorization of both the control application and the user who operates the electronic device that hosts the control application, which further improves the security and provides device interoperability in AID systems and other personalized healthcare systems.

This disclosure is described in connection with what are considered to be the most practical and preferred embodiments. However, these embodiments are presented by way of illustration and are not intended to limit the scope of protection to the disclosed embodiments. Accordingly, one of skill in the art will realize that this disclosure encompasses all modifications and alternative arrangements within the spirit and scope of the disclosure and as set forth in the following claims.

What is claimed is:

1. A method for secure medical device interoperability comprising:
   executing, with a processor in an electronic device controlled by a user, a control application configured to communicate with a medical device operated by the user;
   receiving, with the electronic device, user authentication data generated in response to a user authentication process, the user authentication process further comprising:
      receiving, with the electronic device, authentication input data from the user, the authentication input data not being provided to the control application;
      transmitting, with the electronic device, an authentication request corresponding to the authentication input data to an authentication service; and
      receiving, with the control application, the user authentication data as a user authentication token from the authentication service, the user authentication token being received in response to a successful authentication of the user based on the authentication request;
   establishing an untrusted connection between the electronic device and the medical device;
   receiving, with the electronic device, a key identifier from the medical device through the untrusted connection;
   transmitting, with the electronic device, a message containing data corresponding to an identifier of the user, the user authentication data, the key identifier, an identifier of the control application, and a cryptographic signature of the message to an authorization service, the cryptographic signature being generated using a secret key stored in a memory of the electronic device;
   receiving, with the electronic device, a medical device cryptographic key from the authorization service only in response to successful verification of the message that authorizes the user and the control application; and establishing a trusted connection between the electronic device and the medical device using the medical device cryptographic key to enable at least one of control communication and data communication between the control application and the medical device.

2. The method of claim 1, wherein the user authentication token contains the identifier of the user and the user authentication data.

3. The method of claim 1, the generating of the cryptographic signature further comprising:

generating the cryptographic signature as a hashed message authentication code (HMAC) corresponding to the identifier of the user, the user authentication data, the key identifier, and the identifier of the control application, using the secret key and a cryptographically secure hash function.

4. The method of claim 1, wherein the medical device cryptographic key is a public key corresponding to a private key stored in a memory of the medical device.

5. The method of claim 4, the establishing of the trusted connection between the electronic device and the medical device further comprising:

generating, with the control application, a control application public key and corresponding control application private key;

transmitting, the control application public key to the medical device; and performing a key exchange protocol to establish the trusted connection between the control application and the medical device based on the control application public key, the control application private key, the public key and the private key of the medical device.

6. The method of claim 1, wherein the medical device cryptographic key is a shared-secret cryptographic key that is identical to a shared-secret key cryptographic stored in a memory of the medical device.

7. The method of claim 1, wherein the electronic device is a smartphone.

8. The method of claim 1, wherein the medical device is selected from the group consisting of an insulin pump, a continuous glucose meter, a spot blood glucose meter, and an electronic medication delivery device.

* * * * *